No. 680,086. Patented Aug. 6, 1901.
F. H. TURNER.
MACHINE FOR MANUFACTURING RUBBER ARTICLES.
(Application filed July 9, 1900.)
(No Model.) 3 Sheets—Sheet 1.
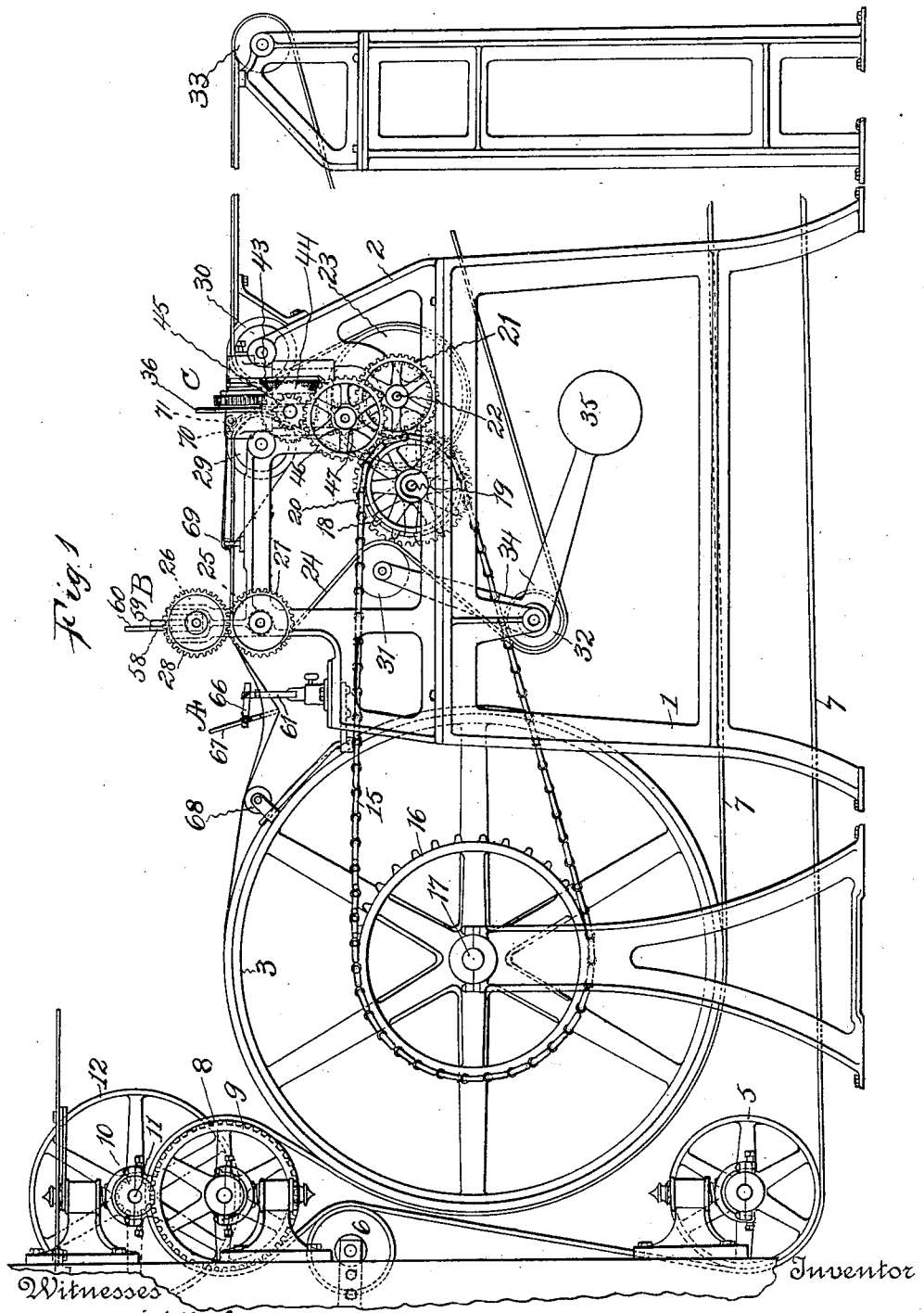
Witnesses
Luitgard Morba
J. O. Dimond
Inventor
Frank H. Turner
By W. E. Simonds
Attorney No. 680,086. Patented Aug. 6, 1901.
F. H. TURNER.
MACHINE FOR MANUFACTURING RUBBER ARTICLES.
(Application filed July 9, 1900.)
(No Model.) 3 Sheets—Sheet 2.
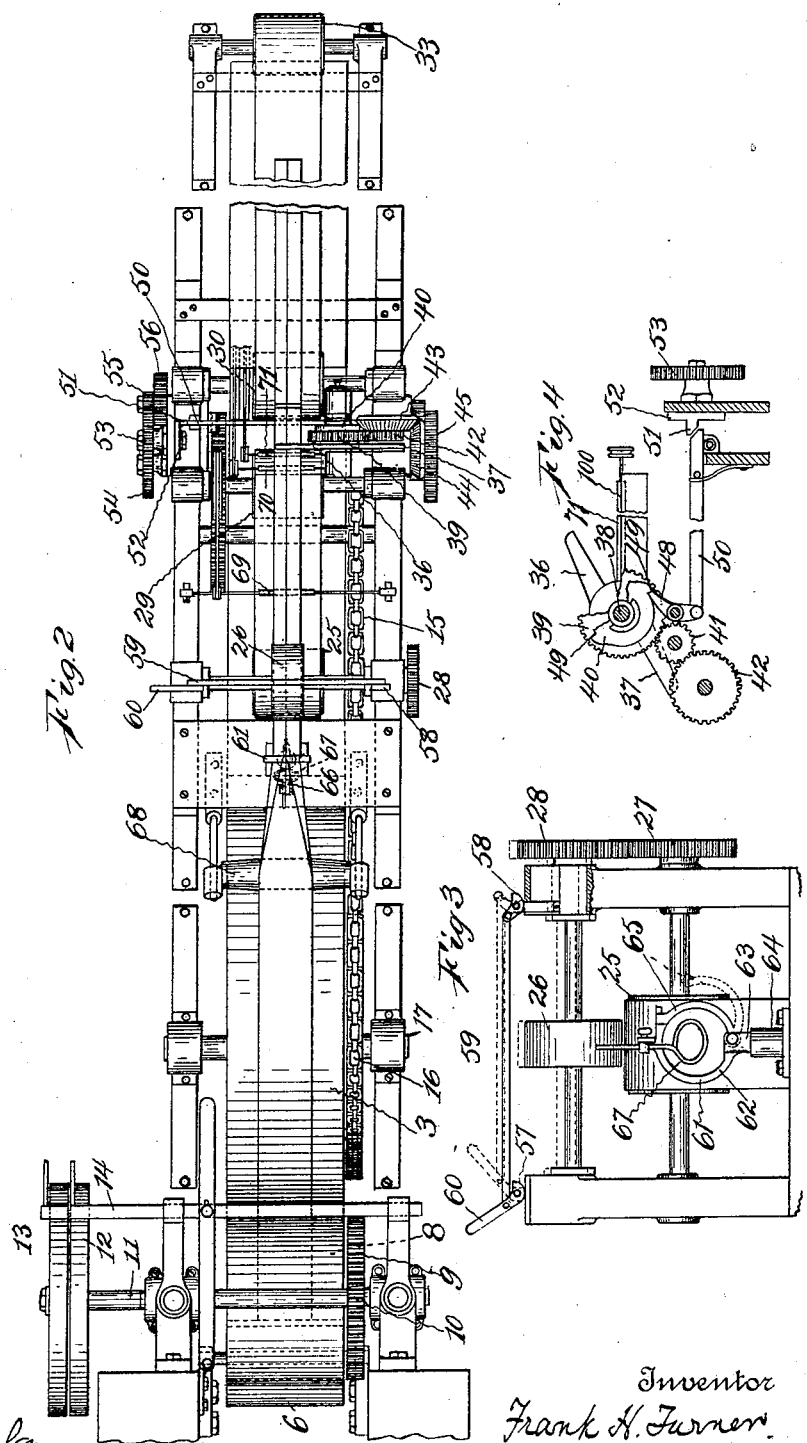

No. 680,086. Patented Aug. 6, 1901.
F. H. TURNER.
MACHINE FOR MANUFACTURING RUBBER ARTICLES.
(Application filed July 9, 1900.)
(No Model.) 3 Sheets—Sheet 3.

ated by the gears above named serves to
UNITED STATES PATENT OFFICE.

FRANK H. TURNER, OF HARTFORD, CONNECTICUT.

MACHINE FOR MANUFACTURING RUBBER ARTICLES.

SPECIFICATION forming part of Letters Patent No. 680,086, dated August 6, 1901.

Application filed July 9, 1900. Serial No. 22,922. (No model.)

*To all whom it may concern:*

Be it known that I, FRANK H. TURNER, a citizen of the United States, and a resident of Hartford, in the county of Hartford and State of Connecticut, (whose post-office address is No. 738 Park street, Hartford, Connecticut,) have invented a certain new and useful Machine for Manufacturing Rubber Articles, of which the following, when taken in connection with the drawings, is a description whereby any one skilled in the art may make and use the same.

My invention relates more especially to a machine for folding a strip of rubber or like material and uniting its two edges to form said strip into a tube with but a single seam. The rubber is first prepared and has its two edges evenly cut and parallel to each other. These strips are delivered to the machine by suitable carrier-belts, their edges being first covered with a suitable adhesive, as cement, and are so folded that the two edges are abutted and pressed together to form the tube.

The object of my improvement is to produce a machine which will receive the strips of rubber prepared as above stated and automatically bring the edges into close contact, press them together, and form a tight tube, combined with mechanism for automatically cutting the finished tube into predetermined lengths.

Figure 5:
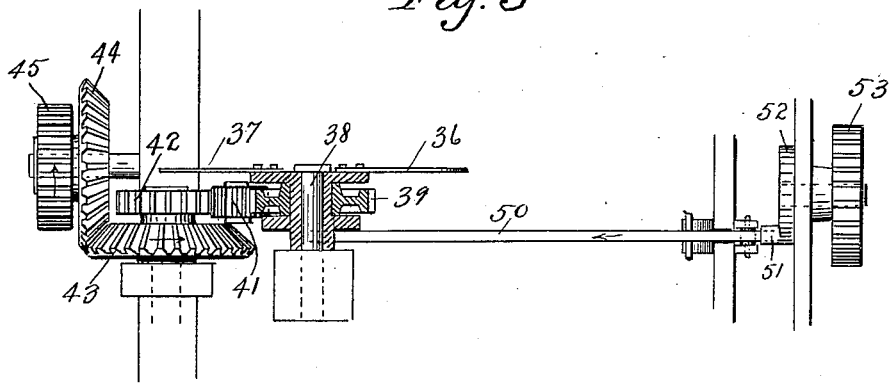
Figure 6:
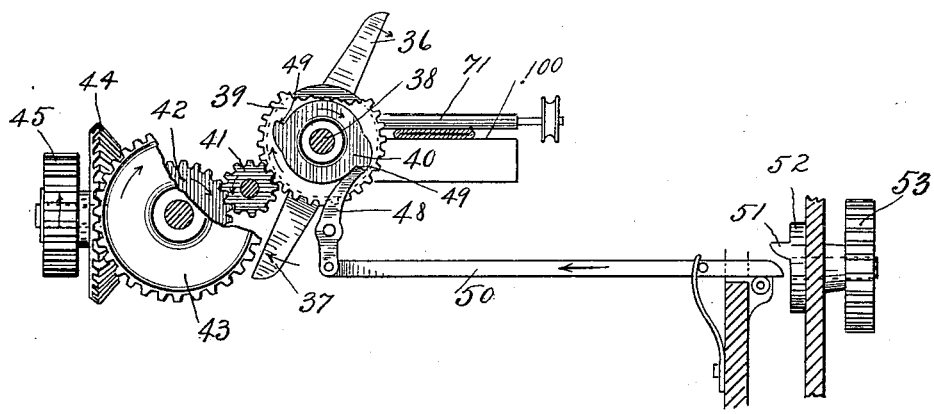

Referring to the drawings, Figure 1 is a side elevation of my improved machine. Fig. 2 is a plan view of the parts shown in Fig. 1. Fig. 3 is a view, on a large scale, of the guide and forming rings and presser-rolls. Fig. 4 is a detailed view showing the cutters and appurtenant parts. Fig. 5 is a plan view, on enlarged scale, of the cutters and the tripping mechanism. Fig. 6 is an elevation looking from the bottom of Fig. 5.

In the accompanying drawings there is shown a machine for folding and compressing strips of rubber to form them into a tube. Of course it is understood that the strips of rubber are first prepared of a suitable width and have their edges smeared with adhesive. The rubber may be prepared for the forming-machine in any suitable manner and with any desired mechanism, though it is preferably worked into the required form by a cutting and gumming machine similar to the one which forms the subject-matter of my separate application of even date with the application describing this machine. When the two machines are used together, a single belt serves to drive both and forms a convenient means for transferring the material from one machine to the other. This belt may be driven from any suitable source of power and, as indicated in the drawings, is driven by a pulley 8, which receives its movement through the gear 9 from a pinion 10, secured to the main shaft 11, which is driven by the fast pulley 12. A loose pulley 13 is also arranged on this shaft, the two pulleys having a shifting rod 14, which forms a convenient means of starting or stopping the belt.

The operating mechanism of the machine receives the proper movement through a main drum 3, which has its periphery running well under the surface of the pulley 8. The belt 7 passes partly around the main driving-drum 3 of the machine, then over the driving-pulley 8, over an idler 6, and around a second idler 5 to the machine which is used for preparing the strips of rubber. In case the forming-machine is used separately this belt 7 after passing about the idler 5 may be passed around a pulley located at a suitable distance from the machine, and in this case the belt 7 merely serves to drive the drum 3 and carry the material into the machine from any convenient point.

The numeral 1 denotes the base of the machine, supporting the frame 2, which bears the main operating mechanism. The main mechanism may be divided into three distinct parts—the "former" denoted at A, the "presser" denoted at B, and the "cutter" at C. The cutting and pressing mechanisms are driven through suitable gears by a sprocket-chain 15, passing about a sprocket 16, fast to the main-drum shaft 17, and a sprocket 18, mounted on a shaft 19. On this shaft 19 is also secured a gear 20, meshing with the gear 21, fast to the shaft 22, which bears a drum 23. This drum 23 when rotated by the gears above named serves to drive a belt 24, which rotates the presser-rolls 25 26 through intermeshing gears 27 28. Above the drum 23, located parallel with and at either side of its axis, are two drums 29 30. These two drums are arranged with their axes in the same horizontal plane and just far enough apart to permit the rotary cutters of the cutting mechanism C to pass between them without in any way interfering with the belt 24. From the drum 23 the belt passes over the drum 29, thence over the presser-roll 25, idlers 31, 32, and 33, to drum 30, and then back to the drum 23. The idler 31 is mounted on the end of a lever 34, which has on one of its arms a weight 35, which always holds the idler 31 in close contact with the belt 24 and gives it the proper tension. It will be seen from the above description that the belt 24 is essentially a carrier, while it serves the purpose of driving the presser-rolls; and, while an endless belt, it is broken as relates to its carrying-surface carrier at the point where the cutters are located.

The cutter mechanism comprises a pair of cutter-arms 36 37, loosely mounted upon a shaft 38. These cutters are held with a frictional grasp by a gear 39, mounted on a sleeve integral with the cutters. The gear 39 is driven by a train of gears 41 42, the latter driven by a beveled gear 43, meshing with the beveled gear 44, which is driven by the gear 45, receiving its motion through gears 46 and pinion 47, the latter meshing with the gear 21. The gear 39 is rotated continuously and at a considerable rate of speed, and were it not for the detent-cam 40, fast on the sleeve bearing the cutters, the cutters 36 37, through the frictional grasp of the gear 39, would rotate with the latter. To prevent movement of the cutters except at predetermined times, a pawl 48 coöperates with shoulders 49 upon the detent-cam 40 and prevents the movement of the latter except when the pawl 48 is moved out of engagement with one of the shoulders 49. For operating the pawl 48 a releasing-rod 50 is connected to its lower end and is adapted to be moved by a cam 51 on the face of a disk 52, which is driven by a gear 53. This gear 53 is driven by a set of change-gears 54 55 56, which are in turn driven from the main driving mechanism of the machine. These change-gears are arranged and made interchangeable with other gears for the purpose of varying the time at which the knock-off cam 51 shall release the pawl 48 and permit the cutters to act. It is evident from this arrangement of parts that the cutters may be caused to operate at any predetermined time, and thus the length of the tube which is cut off from a strip of material may be varied. The pawl 48 is normally held in engagement with one of the shoulders 49 of the detent-cam, of which there are two, located at substantially right angles to the line of the cutting-blades 36 37, as clearly shown in Fig. 4. The cutters are arranged to give a quick downward sweeping cut upon being released by the knock-off cam 51, coöperating with the pawl 48, and the instant one cutter has been released and performed its function a second is brought into position to operate. Of course it is obvious that there must be two jaws to the cutting mechanism, and as the two members 36 and 37 are revolubly mounted and integral the second cutting-jaw is formed for convenience upon the frame of the machine, as indicated at 100, Fig. 4.

At B, Fig. 1 of the drawings, is shown a pair of presser-rolls which are adapted to receive the tube after it has passed through the former, hereinafter described, and press its two edges firmly together, at the same time feeding it forward to the cutters. The presser-roll 26 is mounted in bearings which are movable in a vertical plane to permit the roll being raised slightly to insert the tube which has been formed. In Fig. 3 there is shown a mechanism for raising and lowering the roll 26, which consists of a pair of cams 57 58, which are adapted to move simultaneously through the medium of a connecting-rod 59 upon movement of the hand-lever 60.

Just in front of and located slightly below the contacting surfaces of the presser-rolls is located a forming mechanism, as indicated at A, Fig. 1. This forming mechanism comprises a former-ring 61, which is adjustable with relation to the rolls 25 26. For convenience this ring comprises a main section 62, mounted upon a spindle 63, which is adjustably secured in a bearing 64, and a hinged section 65, which may be moved out of its closed position, as indicated in dotted outline in Fig. 3 of the drawings. When the ring is open, as shown in dotted outline, the strip of material which is to be formed may be easily threaded into position. At the upper end of the ring 61 an adjustable bar 66 is arranged to support the guide-ring 67, which is adjustably mounted upon the bar. This guide-ring 67 has what might be termed a "universal" adjustment so that it may be inclined at the proper angle to the former-ring 61 to properly guide the strip of material to it.

A deflector-roll 68 is arranged to divert the strip of material which is fed into the machine upon the main drum 3 as it passes to the forming mechanism. As the cutters operate to cut the tube there is a tendency of the stock to stick to the lower cutter 100, and to obviate any difficulty of this sort a series of deflector-rolls are arranged just in advance of the cutters, as indicated at 69, 70, and 71. These rolls are of small diameter, located just over the carrier-belt, and are rotated by suitable driving-belts at a speed slightly greater than the speed of the carrier-belt. The roll 71 is located just clear of the cutters and starts the stock forward after it has been momentarily retarded by the cutters. This arrangement of deflector-rolls is important in devices of this class, especially when they are used for forming sticky material, such as rubber.

The operation of the device is as follows: Strips of material of a proper width and with their edges suitably gummed are fed into the machine on the upper surface of the feed and driving belt 7, are passed about the drum 3, through the forming-ring 61, being first passed under the guide-ring 67. As the material passes through the opening between these two rings its central portion is depressed and its two edges are turned upward and toward each other until they closely abut. Just as they come into contact they are passed between the presser-rolls, which unite them and roll the two edges well down to form a smooth surface. From the presser-rolls the now-finished tube is fed to the cutters, which are rotated at predetermined times and cut the tube off into the required lengths. From the cutters the finished tube is carried forward upon the carrier-belt 24 to any convenient point.

While I have shown and described herein a specific mechanism for forming strips of material into a tube, I do not desire to limit myself to the exact mechanism shown and described, as variations in the details of construction may be made without departing from the spirit of my invention, the gist of which is set forth in the following claims.

I claim as my improvement—

1. In a machine for forming tubes or like articles, a feeding mechanism and means for operating it, a forming mechanism adapted to receive the material from said mechanism and including two rings adjustable with relation to each other, and means whereby the opposite edges of the strip of material are brought into close contact and maintained in the same plane.

2. In a machine for forming tubes or like articles, a feeding mechanism including a combined feeding and driving belt and means for operating it, a forming mechanism adapted to receive the material from said feeding mechanism while off the belt and in a flat or strip-like condition, means for curling said material into tubular forms, means coincident with said last-named means for abutting the extreme edges of the material, means for pressing the edges into close alinement, and means for cutting the tubular product into predetermined lengths.

3. In combination in a device of the class specified, a combined feeding and driving belt and means for operating it, a forming mechanism adapted to bring the two edges of a strip of material into close contact, means for pressing the two edges into alinement, means for cutting the tubular product into predetermined lengths, and means for conveying the material to and from the several mechanisms above set out.

4. In combination, a main driving and feeding belt, a drum driven by said belt, mechanism driven by said drum and including an endless belt arranged in a tortuous path, and a cutting mechanism arranged to operate transversely of said belt without affecting the operation of the latter.

5. In a machine for forming tubes, the combination with the feeding, forming and pressing mechanism, of a rotary frictionally-driven cutter adapted to automatically cut a material into predetermined lengths, means for holding the cutter from action, means for releasing it at predetermined times, and means for adjusting the periods of such release.

6. In combination, in a machine for forming tubes from strips of material including feeding and forming mechanism, a cutting mechanism comprising swinging arms alternately operated and adapted to automatically cut the tubes into predetermined lengths, and means for varying the period between the strokes of the cutters.

7. In combination, in a device of the class specified, a cutting mechanism including cutters, frictional means for moving said cutters, means for holding said cutters from action and means for releasing the cutters at predetermined times.

8. In combination in a device of the class specified, a cutting mechanism including cutter-bars, means for holding the cutter-bars inoperative, means for rotating the cutter-bars upon their release, said means being constantly rotated and acting upon the cutters with a frictional grasp, and means for releasing the cutters at predetermined times.

9. In combination, in a machine for forming tubes, a pair of presser-rolls, a former-ring adjustable with respect to the rolls, and a universally-adjustable guide-ring coöperating with the former-ring and adapted to place the two edges of a strip of material together.

10. In combination, in a machine for forming tubes, an adjustable former-ring having a hinged section, a guide-ring mounted in operative relation to the former-ring and adapted to coöperate with it to unite the two edges of a strip of material, and means for passing the strip of material through the former-ring.

11. In combination in a machine for forming tubes, presser-rolls adapted to press the edges of the tube into close alinement, one of said rolls being adjustable toward and from the other and held against it with yielding force, the feed and driving belt passing around the last-named roll, and a cutting mechanism adapted to operate at predetermined times.

12. A device of the class specified comprising a feeding and carrying belt and cutters, a system of power-driven deflector-rolls adapted to deflect the stock from the carrying-belt and drive it forward.

13. In combination in a device of the class specified, a carrying-belt adapted to feed the stock to the cutting mechanism, cutters adapted to cut the stock into predetermined lengths, means adapted to release the stock from the carrier-belt and drive it forward, said means operating at a greater speed than the carrier.

14. A device of the class specified, comprising a feeding and carrying belt and cutting mechanism, and a system of rolls having a deflecting and driving action with relation to the stock borne upon the carrier-belt.

FRANK H. TURNER.

Witnesses:
 EDWARD M. YEOMANS,
 LUITGARD MORBA.